Nov. 6, 1962

M. FRANÇOIS 3,062,356

INDEX UNIT FOR A CONVEYOR CARRIAGE IN A MACHINE FOR
SORTING OUT LETTERS OR OTHER DOCUMENTS

Filed July 6, 1959

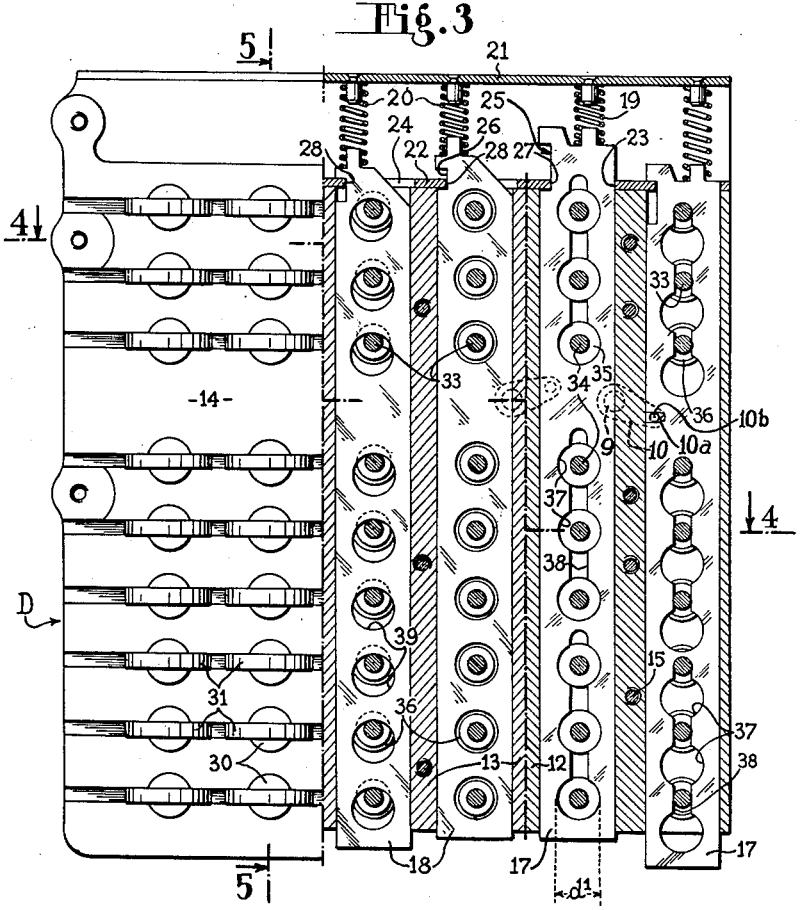

Nov. 6, 1962 M. FRANÇOIS 3,062,356
INDEX UNIT FOR A CONVEYOR CARRIAGE IN A MACHINE FOR
SORTING OUT LETTERS OR OTHER DOCUMENTS
Filed July 6, 1959 5 Sheets-Sheet 4
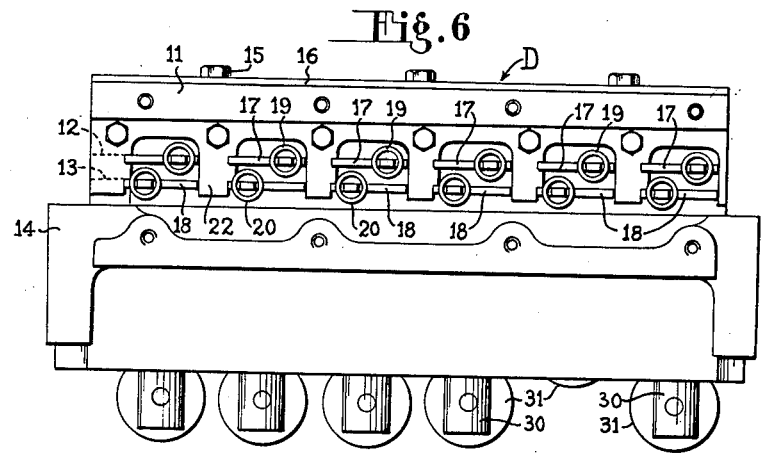
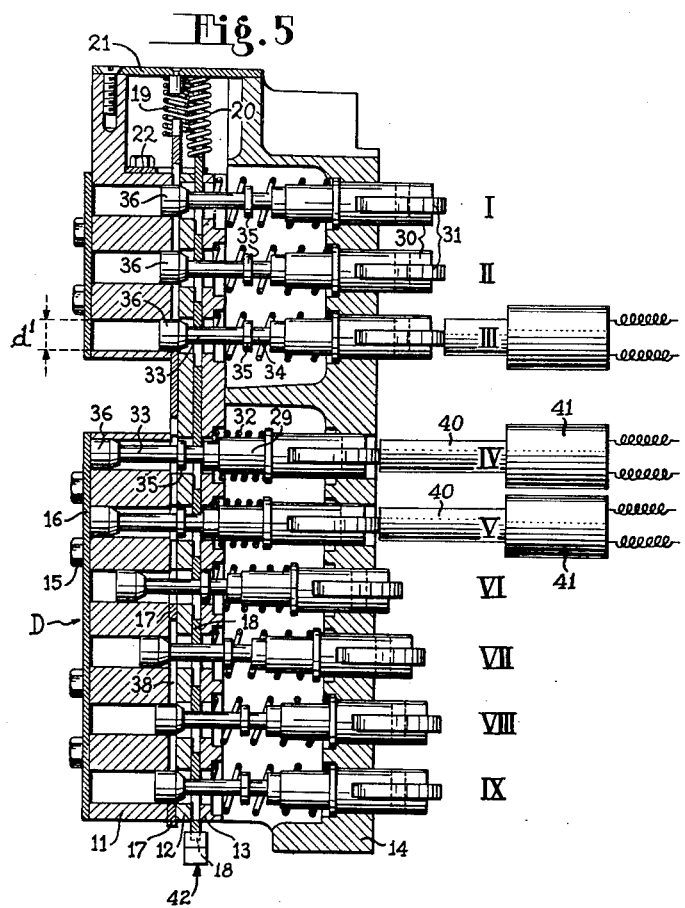

EXAMPLE I

EXAMPLE II

INVENTOR

MARCEL FRANÇOIS

BY J. Delattre-Seguy

ATTORNEY

United States Patent Office 3,062,356
Patented Nov. 6, 1962

3,062,356
INDEX UNIT FOR A CONVEYOR CARRIAGE IN A MACHINE FOR SORTING OUT LETTERS OR OTHER DOCUMENTS
Marcel François, Chatenay-Malabry, France, assignor to Hotchkiss-Brandt, Paris, France, a French body corporate
Filed July 6, 1959, Ser. No. 825,309
Claims priority, application France July 10, 1958
4 Claims. (Cl. 198—38)

The present invention relates to the sorting out of letters or other documents and its object is to provide an index or code unit for a conveyor carriage conveying these documents in a sorting out machine of the type having a plurality of operator stations at which the destinations of the documents to be sorted out are identified by the operators and these documents are loaded one by one into compartments or cups in the carriages and are subsequently deposited by the latter in containers each one of which pertains to a given destination, each carriage passing in turn in front of each operator station and then over each container.

This carriage comprises as many cups as there are operator stations and each of the cups is provided for one of these stations, the cups of the same row in all the carriages being related to a same station; each cup is closed at its lower end by a flap which only opens when its corresponding cup passes over the container corresponding to the destination of the document conveyed in the cup. It will be understood that it is necessary to provide on the carriage an index unit comprising for each cup an index or code device capable of retaining the memory of a given code value, this value pertaining in accordance with this code to the destination of the conveyed document and being recorded by an operation effected by the operator, for example by his action on a keyboard, in this index device at the moment when the carriage passes by the operator station corresponding to the cup in question. Further, it is necessary to ensure the automatic opening of the flap, in accordance with each memory, over the container which corresponds to the value of the recorded code, that is, to the destination of the conveyed document, in order that the document should fall into this container.

Various more or less complex solutions of this double problem have already been proposed. They are generally satisfactory when the sorting out is effected at a relatively low rate. On the other hand, the problem becomes much more difficult to solve when this rate becomes high, for example when it is required that each operator sort out a very great number of documents within a given period of time (for example 4,000 letters per hour).

Considerations of the smallest possible size and a continuous speed of displacement of the carriages compatible with the dropping of the documents into the containers, necessitate avoiding any fixed opening device for the cups which acts from the outside of the cups in movement. Indeed, with cups having a width of, for example, 25 mm. and moving at a speed of about 0.4 metres per sec. it can be seen that a cup takes $$\frac{1 \times 25}{400} = 0.0625 \text{ sec.}$$

to pass in front of a fixed reference point. In practice owing to the fact that the various elements do not operate exactly on time, the time of operation and return to a position of rest of such a device is at the most equal to 0.03 sec. which is very short for ensuring with reliability the transmission of the opening order by electrical or other intermediate transmission means.

An object of the invention is to provide an index unit for a carriage conveying documents to be sorted out, wherein, for the purpose of permitting a very high rate of work, the devices pertaining to the various cups and constituting the memory of the code values recorded at each of the loading or operator stations, determine by themselves and individually the actuation of the flap constituting the retractable bottom of the cup pertaining to each of said devices.

Among its characteristics, said index unit comprises: for each flap of the carriage, a slide which actuates said flap and is biased in such direction that the flap is opened by a spring, the slide being maintained in the closed flap position by one rod of a row of rods or indexes which protrude from the unit and are capable of assuming either a coded or non-coded position; each rod comprises a large recess so that in the coded position it is located in line with an elongated aperture in the corresponding slide which is then released from said rod, and a short recess separated from the large recess by a projection; all the rods, which are provided with return springs biasing them to said non-coded position, are combined with an auxiliary locking element which is biased by elastic means and is adapted to be engaged, on the one hand, in said short recesses in the coded rods and lock them in the position of release of said slide, and on the other hand, in said large recesses in the non-coded rods so as to allow the latter freedom of movement.

With such a device, if, at the operator station to which a cup of a given row of the carriage corresponds, a document is loaded in this cup, an indexing device, for example having retractable abutments put into their operative position, for example electromagnetically, as a function of the value of the code pertaining to said document, permits, as known per se, bringing one or more rods into the coded position; this releases, as far as these rods are concerned, the actuating slide and retains the memory of said code value, because the position of said rods remains fixed owing to the locking element. Further, if in the region of the container corresponding to this destination there are provided, in the known manner, other abutments, for example in the form of fixed ramps which are complementary to the preceding retractible abutments in that they are situated in line with the rods not actuated by the indexing device, then, when the cup passes in line with this container, the non-coded rods are actuated in turn by these complementary abutments or ramps and shifted over such a distance as to bring their large recess in line with the actuating slide, and the latter, which is then fully released, retracts the flap retaining the document and the latter falls into the required container.

Another object of the invention is to provide a conveyor carriage having cups, in which carriage the flaps closing the bottoms of the cups are operatively connected to the actuating slides of the aforementioned index unit.

Further features and advantages of the invention will be apparent from the ensuing description, with reference to the accompanying drawings to which the invention is in no way restricted.

In the drawings:

FIG. 3 is a half-elevational view and a half-sectional view taken along line 3—3 of FIG. 4, of the index unit for said carriage;

FIG. 5 is a vertical sectional view taken along line 5—5 of FIG. 3, and

FIG. 6 is a plan view of the index unit shown in FIG. 3.

Figure 7:
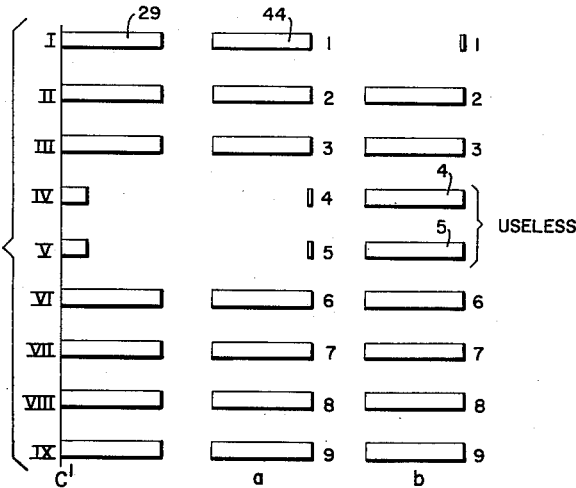
Figure 8:
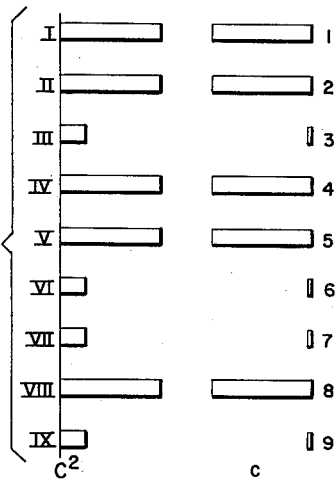

FIGS. 7 and 8 illustrate diagrammatically two examples of coding. Example I (FIG. 7) corresponds to a code $C^1$ obtained according to FIGS. 1 to 6. Example II (FIG. 8) corresponds to any other code $C^2$, selected among the number of codes which must be obtained if the installation provides for an identical number of destinations.

Figure 2:
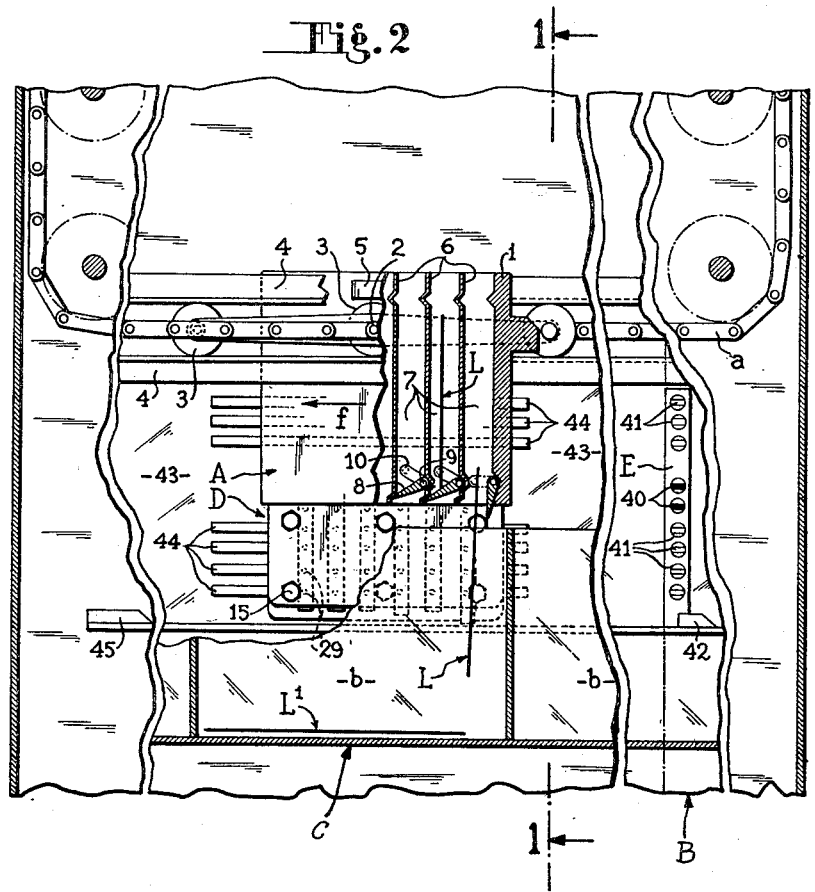
FIG. 2 is a cross-sectional view of said carriage taken along line 2—2 of FIG. 1, and shows in elevation, portions of said sorting out machine co-operating with the index unit of this carriage.

On FIG. 2, the downstream direction is from right to left, as indicated by arrow $f$.

Figure 1:
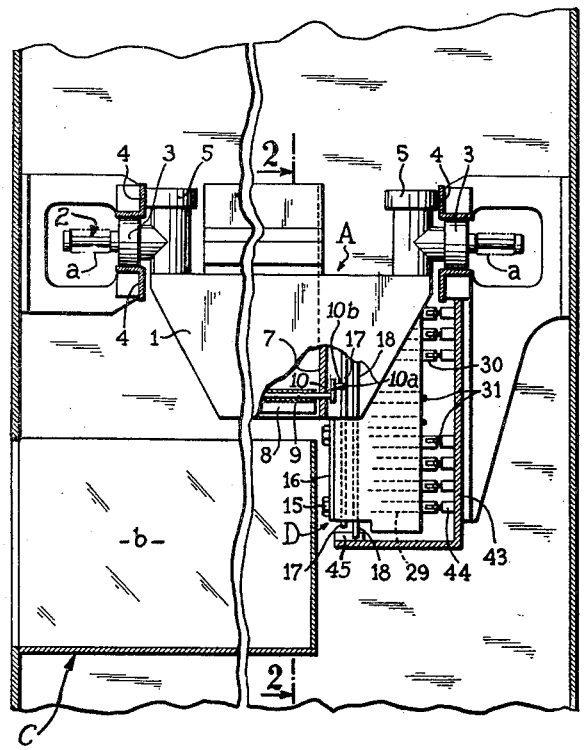
FIG. 1 is an elevational view, partly in section, taken along line 1—1 of FIG. 2, of a carriage provided with an index unit according to the invention and of a part of the sorting out machine in which said carriage moves.

In the embodiment shown in FIGS. 1 and 2, the invention is applied to a conveyor carriage A connected to two parallel endless conveyor chains $a$ which move the carriage in the direction of arrow $f$ (FIG. 2) in front of a number (six in the presently-described embodiment) of loading or operator stations B and then over a large number of containers $b$ which are disposed in one or several rows in a filing cabinet C.

This carriage A comprises a body 1 suspended through the medium of two coaxial journals 2 from chains $a$ and provided with two pairs of rollers 3 which have horizontal axes and roll between two pairs of fixed rails 4, and two guide rollers 5 which have vertical axes and roll against the two upper rails.

The body 1 is provided with vertical throughway apertures, and partitions 6 form therein in side-by-side relation as many transverse cups 7 as there are operator stations B, that is, six in the presently-described embodiment. Each of these cups pertains to one of these operator stations B where it is capable of receiving a single document L (FIG. 2) which it must release in accordance with the destination of the latter into that one of the containers $b$ which pertains to this destination.

Each cup 7 is closed at its base by a flap 8 mounted for pivotal movement about a pivot pin 9. The latter is keyed to a crank 10 which is actuated by the index unit D of the invention.

This unit D, which is fixed on the side of the carriage A, comprises (FIGS. 3 to 6) a body having four elements 11, 12, 13, and 14 which are all fixed by bolts 15 to a wall 16. The unit D is secured to the carriage A by other screws which extend through apertures 16a formed in the element 14.

These elements house as many identical independent index devices as the carriage A comprises cups 7, namely six in the presently-described embodiment.

Each index device comprises an actuating slide 17 in a transverse slot $10^a$ (FIGS. 1 and 3) in which the handle $10^b$ of the crank 10, relating to the flap 8 of the corresponding cup, is engaged. Said slide 17 is movable between the elements 11 and 12 and a locking strip 18 movable between the elements 12 and 13. This slide and this strip are biased respectively downwardly by springs 19 and 20 which bear at their upper ends against a cover 21 (not shown in FIG. 6). Their travel is limited by a plate 22 provided with apertures 23 and 24 (FIG. 3) in which the slide and the strip are slidable. The slide and strip have recesses 25 and 26 in which are engaged projections 27 and 28 formed on the plate 22.

In respect of each cup, the slide 17 and the strip 18 co-operate with $m$ rods or indexes designated as a whole at 29 which are in superimposed relation (FIGS. 1 to 6) and have a coded position and a non-coded position.

Each of these rods 29, whose rows are designated in FIG. 5 by reference numerals I to IX, protrudes from the index unit D and has at its end a fork 30 carrying a roller 31 adapted to contact projections and indexing and disindexing ramps which are known per se and are briefly described hereinafter.

Each rod 29 is biased by a spring 32 (FIGS. 4 and 5) in the direction for protruding to the maximum extent from the unit D (position shown by the rods I to III and VIII, IX).

Figure 4:
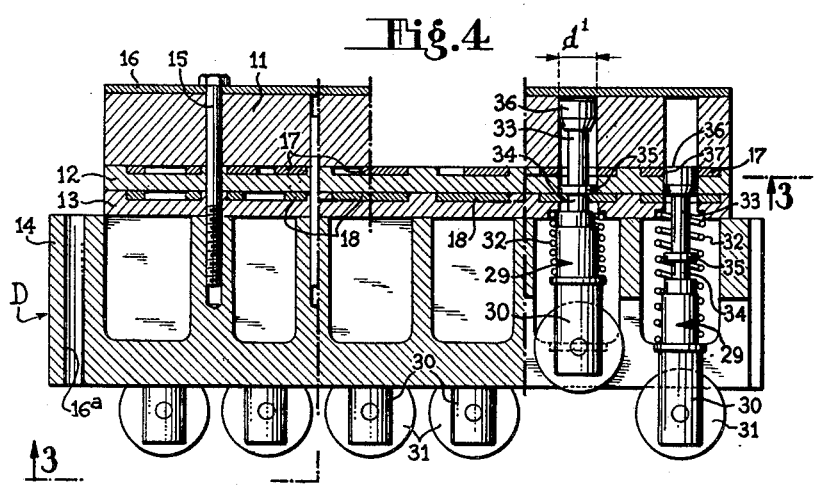
FIG. 4 is a horizontal sectional view taken along line 4—4 of FIG. 3.

Each of these rods 29 comprises a large main recess in the form of an annular groove 33 and a shorter recess in the form of another annular groove 34 separated from the groove 33 by a flange 35. The inner end 36 of each rod has the normal diameter $d^1$ of this rod, which is equivalent to the diameter of the flange 35, whereas in the recesses 33 and 34 the rod has a much smaller diameter (FIGS. 3, 4 and 5).

The actuating slide 17 is provided with as many apertures 37 as there are rods 29. Each of these apertures 37, whose centre is situated on the axis of the corresponding rod 29 when the slide is in its raised position, is circular and has such diameter as to slightly clear the parts of the rod having the diameter $d^1$ (see FIG. 3). The apertures 37 are interconnected by openings constituted by elongated slots 38 whose width is slightly more than the diameter of the recesses 33. The slide 17 has such transverse position (FIG. 5) that the rods 29, when in their position of maximum protrusion, corresponding to the non-coded position I, II, III . . . , have their ends 36 in line with the slide 17. Further, in this position of the slide 17, the rods in the coded position (rods IV and V) have their recesses 33 in line with the slide.

The locking strip 18 comprises circular apertures 39 (FIG. 3) having a diameter slightly greater than $d^1$. Further, its transverse position is such that (FIG. 5) the rods 29 in their position of maximum protrusion (I, II, III, and VIII, IX) have their large recess 33 in line with this strip as do the rods which are partly pushed in to position VI or VII. On the other hand, the rods in the coded position (position of the rods IV and V) have their short recess 34 in line with the locking strip 18.

Each carriage A and its index unit D are combined with the following devices (FIG. 2):

Firstly, at each operator station B (one of said stations being shown partially on FIG. 2, and the six stations provided for in the present illustration being disposed, for instance, one after the other before the cabinet or cabinets C containing the containers $b$), the carriage A is combined with an indexing device E (FIG. 2) having $m$ retractable projections or abutments 40, $m$ being the number of rods or indexes 29 provided for in each row of the indexing device of the unit D, namely nine in the example, these abutments 40 being constituted, for example, as known per se, by the armatures of electromagnets 41 which, when they are excited, bring these projections into the path of the rods 29 of the cup of the row corresponding to that of the considered operator station so as to move them from the position of rest or the decoded position (positions I, II, III, VIII, IX) to the coded position (IV or V) (see FIG. 5 where the two electromagnets 41 corresponding to rods IV and V are shown excited; their armatures 40 are forward; on the other hand the armature of rod III is shown, for illustration, in retracted position). These electromagnets are excited at the command post by a coding operation effected by the operator positioned at the station, for example by operating keys for each letter or other document in accordance with its destination on a keyboard (not shown).

Secondly, with an abutment ramp 42 (FIG. 2) disposed in such position as to raise the locking strip 18 by acting on its lower end, this ramp being slightly offset from the indexing abutments 40 in the opposite direction to the direction of movement of the carriages (arrow $f$) so as to begin ahead of the abutments 40 and finish a little ahead of them. An overlapping between these abutments could, however, exist.

In line with each container $b$ there are provided on a fixed longitudinal wall 43, horizontal ramps 44 (FIGS. 1 and 2) along which the rollers 31 of the rods 29 are adapted to roll so as to push the rods from the non-coded positions (I, II . . .) to a position between the extreme positions VI and VII which correspond to the limits of the positions between which the slide 17 is freed from the considered rod, the locking strip 18 being in active position of locking; thus, for all the positions of the non-coded rods 29 which are located between these two limit positions, the slide 17 is located in front of the small diameter part 33 of each considered rod 29. For each container there are provided additional ramps 44 which are thus complementary to the indexing abutments or projections 40 of the indexing devices E of the operator stations. This means that there are provided, in accordance with the predetermined code and taking into account the value of the code pertaining to the compartment considered, one or more ramps aligned with the rod or rods for which the code corresponding to said compartment does not provide an active indexing projection 40 in the indexing device E.

On the downstream side of the filing cabinet C or on the return portion of the conveyor chains $a$ there is provided a fixed projection 45 (FIGS. 1 and 2) adapted to temporarily raise the slide 17 and the strip 18.

The unit operates in the following manner:

In the position of rest and when the carriage A reaches an operator station B, the cups 7 have their flaps 8 locked in their closed position and all the rods or indexes 29 are in their non-coded position of maximum protrusion (such as positions I and II). The slides 17 are all stopped in their raised position in opposition to the action of their springs 19 which are compressed. These slides rest on the non-recessed portions 36 of all the rods 29. On the other hand, all the trips 18 are lowered, since they are biased by their springs 20 against the large recesses 33 of the rods 29.

In the course of the travelling past any of the operator stations B, if one of the cups 7 receives a document to which a given destination corresponds, this cup records at the same time the corresponding value of the code in the form of the depression of one or more of the rods 29 of the corresponding row of rods of its index unit D. For example, the rods IV and V (FIG. 5) are fully depressed owing to the contact of the corresponding rollers 31 with the indexing projections formed by the armatures 40 which are brought into operative position in their path by the excitation of the corresponding electromagnet 41. The depression of these rods is made possible by the temporary prior raising of the corresponding locking strip 18 by the abutment ramp 42 provided at this operator station. Owing to the aforementioned offset position of the ramp 42 relative to the projections 40, this strip 18 drops as soon as the rods 29 are pushed in and again upon contact of the indexing projections 40, and this strip, by the engagement of the edges of its apertures 39 in the narrow recesses 34 in the rods, maintains the latter in their pushed-in coded position by the abutment of the flanges 35 against this strip.

The depressed or coded rods 29 no longer prevent the slide 17 from being moved downwardly by its spring 19, but this slide remains in its raised position owing to the action of the other non-coded rods 29. The flap 8 of the corresponding cup 7 therefore remains closed and the document L which it has received is conveyed until it is positioned above the container which is to receive this document. In this position, the fixed ramps 44 (which are complementary to the coding abutments or projections 40, as mentioned hereinbefore, a ramp is provided in line with each rod 29 in front of which there is no projection 40 in the corresponding operator station B) by contact with the non-coded rods 29 depress these rods to a position not shown, which is comprised between the two illustrated limit positions for rods VI and VII, and which, therefore, is such that the slide 17 is released from said rods and is shifted downwardly by the spring 19, the flap 8 swings to its open-cup position (as shown in FIG. 2 in respect of the right end cup) and the document drops into the container $b$ pertaining to this document wherein the document lies flat at $L^1$.

At the end of the distribution travel, the ramp 45 temporarily raises the slide 17 and the strip 18 so as to close the flap 8 and allow the springs 32 to return the rods 29 to the non-coded position of maximum protrusion.

The carriage A is ready to once more pass in front of the operator stations B so as to receive eventually further documents L in its various cups.

The operation of the index unit, with particular reference to the code combinations and permutations, can be further explained in connection with FIGS. 7 and 8 as follows:

With reference to FIG. 7, according to code $C^1$, the slides 17 at IV and V have been pushed inward at one of the operator's stations; this code corresponds to one of the receiving containers $b$ (FIGS. 1 and 2).

In order to insure that the document carried by the cup coded for the value $C^1$ of the code be correctly deposited in the container $b$ corresponding to the destination which corresponds in turn to said value of the code, it is necessary that the flap 8 of the cup carrying said document should open only above this particular container $b$. Yet, the opening of the cup by retraction of the flap 8 can occur only when all the rods 29 related to said cup are pushed inward. Since, according to code $C^1$, the rods in coded positions IV and V, at the time of the coding, have alone been retracted, it is therefore necessary that, when the cup corresponding to the particular container $b$ which is to receive the carried document passes over said container, all the rods be pushed in. Thus it is important to provide ramps 44, according to diagram $a$ of FIG. 7; in other words, ramps 44 must be provided at 1, 2, 3, 6, 7, 8 and 9 for all rods 29, except for rods IV and V already retracted. Thus it is seen that the arrangement $a$ of the ramps is complementary of code $C^1$ (FIG. 7).

It must also be noted that the arrangement $b$ of FIG. 7, in which ramps are provided at 2, 3, 4, 5, 6, 7, 8, and 9, but no ramp is provided at 1, will not give the results seeked herein for two reasons:

(1) the rod 29–I will not be retracted and the slide controlling the flap will not be freed;

(2) the ramps 4 and 5 would be useless.

Example II (FIG. 8) illustrates another combination in which the value of code $C^2$ corresponds to the retraction, at one of the control posts, of rods III, VI, VII and IX. The corresponding cup above the compartment to which the value of code $C^2$ is affected will open only if, above said compartment, ramps are provided according to the arrangement $c$, namely according to an arrangement complementary of code $C^2$.

If the code $C^2$ of FIG. 8 is considered, in which rods III, VI, VII and IX have been coded, it is evident, in order that the transported document be deposited according to the code, that all the rods which have not been coded, namely rods I, II, IV, V and VIII, must be retracted. Other combinations could give this result but would be superfluous. For instance, in combination I–V and VIII, it can be seen that a ramp at 3 is useless, since rod III is already coded; likewise in the combination 1, 2, 4 to 6 and 8, since rod VI has been coded; likewise in the combination 1, 2, 4, 5 and 7 to 9, ramps at 7 and 9 are useless, since rods VII and IX have already been coded; the same is true of other positions which includes 1, 2, 4, 5 and 8, since these positions would also include at least one rod which has been coded and for which a ramp is useless. In order that flap 8 opens, it is necessary that all rods 29 have been retracted.

Further, it can be seen that the cup coded according $C^1$ of Example I (FIG. 7) cannot open over the compartment having ramps according to $c$ of Example II (FIG. 8) since the rods III, VI, VII and IX would not be retracted.

Thus, it would be possible to draw a large number of analogous diagrams, all different, corresponding to the selected compartments.

The index unit of the invention is very simple and very reliable in operation, since so long as the non-coded rods rub along the opening ramps 44, opening is possible; thus in theory there is no time limit for this opening.

It will be observed that the slide 17 alone analyses and interprets the opening information furnished by the ramps 44 and thereafter ensures this opening.

Although a specific embodiment of the invention has been described, many modifications and changes may be made therein without departing from the scope of the invention as defined in the appended claims.

Having now described my invention, what I claim as new and desire to secure by Letters Patent is:

1. Index unit for a carriage having a plurality of cups, the bottoms of which latter are constituted by flaps movable between a closed position and a retracted open position corresponding to an opened cup, said carriage being provided for conveying documents from a sorting out station to fixed containers of a sorting out machine, said unit comprising in combination: a body and, provided for each flap of the carriage, a slide actuating the flap and movable in the body between a first position corresponding to a closed cup and a second position corresponding to an open cup and comprising a longitudinal group of openings, connecting means connecting the slide to the corresponding flap, a spring biasing the slide to said first position, a series of index rods the number of which latter equals the number of said apertures in the slide, said rods being disposed in a row and protruding from the unit and being capable of assuming in particular a coded position and a non-coded position, each of said rods comprising a short recess and a long recess so that in said non-coded position the rod constitutes a locking abutment locking the slide whereas in all the other positions of the rod it is in line with one of said openings in the slide which is then released from the rod, return springs each of which acts on one of said rods for urging it to said non-coded position, an auxiliary locking element movable between a retracted position and an operative position in which it is engaged, on the one hand, in the short recesses of the rods in the coded position so as to lock the rods in the position for releasing the slide and, on the other hand, in the long recess of rods in the non-coded position so as to release the rods, and elastically yieldable means for maintaining the auxiliary locking element in said operative position.

2. Index unit as claimed in claim 1, wherein the actuating slide comprises circular apertures in each of which is slidable a rod whose recesses are constituted by peripheral grooves, the openings of the slide being constituted by longitudinal slots whose width is at least equal to the diameter of the said grooves, said slots interconnecting said circular apertures which have a diameter slightly greater than that of the non-recessed part of the rods.

3. In a carriage for conveying documents in a sorting out machine which comprises at least one sorting out station and fixed containers, in combination: a series of cups which are completely open in the vertical direction, each cup being adapted to convey a document from a sorting out station to a container, a flap disposed at the lower end of each cup and movable between a first position for closing the cup and maintaining a document in the latter, and a second position corresponding to an opened cup for allowing said document to fall into the container, and an index unit which comprises a body fixed to the carriage and, provided for each flap of the carriage, a slide actuating the flap and movable in the body between a first position corresponding to a closed cup and a second position corresponding to an open cup and comprising a longitudinal group of openings, connecting means connecting the slide to the corresponding flap, a spring biasing the slide to said first position, a series of index rods the number of which latter equals the number of said apertures in the slide, said rods being disposed in a row and protruding from the unit and being capable of assuming in particular a coded position and a non-coded position, each of said rods comprising a short recess and a long recess so that in said non-coded position the rod constitutes a locking abutment locking the slide whereas in all the other positions of the rod it is in line with one of said openings in the slide which is then released from the rod, return springs each of which acts on one of said rods for urging it to said non-coded position, an auxiliary locking element movable between a retracted position and an operative position in which it is engaged, on the one hand, in the short recesses of the rods in the coded position so as to lock the rods in the position for releasing the slide and, on the other hand, in the long recesses of the rods in the non-coded position so as to release the rods, and elastically yieldable means for maintaining the auxiliary locking element in said operative position.

4. In a machine for sorting out documents, in combination: at least one sorting out station; fixed containers adapted to receive the documents sorted out at said station; carriages for conveying the documents from the station to the containers, each carriage comprising in combination: a series of cups which are completely open in the vertical direction, each cup being adapted to convey a document from a sorting out station to a container, a flap disposed at the lower end of each cup and movable between a first position for closing the cup and maintaining a document in the latter, and a second position corresponding to an opened cup for allowing said document to fall into the container, and an index unit which comprises a body fixed to the carriage and, provided for each flap of the carriage, a slide actuating the flap and movable in the body between a first position corresponding to a closed cup and a second position corresponding to an open cup and comprising a longitudinal group of openings, connecting means connecting the slide to the corresponding flap, a spring biasing the slide to said first position, a series of index rods the number of which latter equals the number of said apertures in the slide, said rods being disposed in a row and protruding from the unit and being capable of assuming in particular a coded position and a non-coded position, each of said rods comprising a short recess and a long recess so that in said non-coded position the rod constitutes a locking abutment locking the slide whereas in all the other positions of the rod it is in line with one of said openings in the slide which is then released from the rod, return springs each of which acts on one of said rods for urging it to said non-coded position, an auxiliary locking element movable between a retracted position and an operative position in which it is engaged, on the one hand, in the short recesses of the rods in the coded position so as to lock the rods in the position for releasing the slide and, on the other hand, in the long recesses of the rods in the non-coded position so as to release the rods, and elastically yieldable means for maintaining the auxiliary locking element in said operative position; an indexing device disposed at each operator station and having retractable abutments adapted to shift the rods of the carriages to said coded position, and a ramp for temporarily retracting the locking element of each index unit and for releasing said element toward the end of the action of the indexing device on the rods; ramps provided in line with each container for depressing the non-coded rods; and a projection disposed on the downstream side of the containers relative to the direction of movement of the carriage for shifting said slides and said locking elements of the index unit of each carriage so as to permit the rods to be returned to said non-coded position by the action of said return springs.

References Cited in the file of this patent

UNITED STATES PATENTS

| | | |
|---|---|---|
| 1,325,247 | Gehring | Dec. 9, 1919 |
| 1,991,237 | Waite | Feb. 12, 1935 |
| 2,757,781 | Freeman | Aug. 7, 1956 |
| 2,901,089 | Rabinow | Aug. 25, 1959 |